(12) United States Patent
Huang et al.

(10) Patent No.: US 12,191,512 B2
(45) Date of Patent: Jan. 7, 2025

(54) BATTERY MODULE

(71) Applicant: Contemporary Amperex Technology Co., Limited, Ningde (CN)

(72) Inventors: Wenqiang Huang, Ningde (CN); Xingyuan Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 756 days.

(21) Appl. No.: 17/352,395

(22) Filed: Jun. 21, 2021

(65) Prior Publication Data

US 2021/0313643 A1 Oct. 7, 2021

Related U.S. Application Data (63) Continuation of application No. PCT/CN2019/124892, filed on Dec. 12, 2019.

(30) Foreign Application Priority Data

Dec. 21, 2018 (CN) .......................... 201822166210.4

(51) Int. Cl.
*H01M 50/209* (2021.01)
*H01M 50/262* (2021.01)
*H01M 50/264* (2021.01)

(52) U.S. Cl.
CPC ....... *H01M 50/209* (2021.01); *H01M 50/262* (2021.01); *H01M 50/264* (2021.01)

(58) Field of Classification Search
CPC . H01M 50/209; H01M 50/262; H01M 50/264
See application file for complete search history.

(56) References Cited

U.S. PATENT DOCUMENTS

2004/0035807 A1 2/2004 Marraffa
2011/0159336 A1* 6/2011 Ohkura ................. H01M 50/20
429/99
(Continued)

FOREIGN PATENT DOCUMENTS

CN 106910851 A 6/2017
CN 207818669 U 9/2018
(Continued)

OTHER PUBLICATIONS

The Communication pursuant to Article 94(3) EPC for Europe an Application No. 19899744.7, dated Aug. 11, 2022, 4 pages.
(Continued)

*Primary Examiner* — Jonathan G Jelsma
(74) *Attorney, Agent, or Firm* — East IP P.C.

(57) ABSTRACT

This application provides a battery module, including a plurality of batteries, a first enclosing plate, and a second enclosing plate. The first enclosing plate includes a first side plate, a first front plate containing a first connecting hole, and a first rear plate containing a third connecting hole. The second enclosing plate includes a second side plate, a second front plate containing a second connecting hole, and a second rear plate containing a fourth connecting hole. The first connecting hole and the second connecting hole are fixedly connected to the first front plate and the second front plate by the fasteners. The third connecting hole and the fourth connecting hole are fixedly connected to the first rear plate and the second rear plate by the fasteners. Both the first enclosing plate and the second enclosing plate form a semi-enclosure structure, and tightly enclose the plurality of batteries.

9 Claims, 5 Drawing Sheets

(56) References Cited

U.S. PATENT DOCUMENTS

| | | | | |
|---|---|---|---|---|
| 2013/0244069 A1* | 9/2013 | Horii | ............... | H01M 10/6571 |
| | | | | 429/90 |
| 2016/0218388 A1* | 7/2016 | Kim | ............... | H01M 10/4257 |
| 2016/0359153 A1 | 12/2016 | Kano et al. | | |

FOREIGN PATENT DOCUMENTS

| | | |
|---|---|---|
| CN | 207818698 U | 9/2018 |
| CN | 208225940 U | 12/2018 |
| CN | 208256757 U | 12/2018 |
| CN | 209104220 U | 7/2019 |
| JP | 2018073543 A | 5/2018 |
| WO | 2013146561 A1 | 10/2013 |

OTHER PUBLICATIONS

The International search report for PCT Application No. PCT/CN2019/124892, dated Mar. 12, 2020, 17 pages.
The extended European search report for EP Application No. 19899744.7, dated Sep. 17, 2021, 7 pages.

* cited by examiner

BATTERY MODULE

CROSS-REFERENCE TO RELATED APPLICATION

This application is a continuation of International Application No. PCT/CN2019/124892 filed on Dec. 12, 2019, which claims priority to Chinese Patent Application No. 201822166210.4 filed on Dec. 21, 2018, titled "BATTERY MODULE", which is incorporated herein by reference in its entirety.

TECHNICAL FIELD

This application relates to the technical field of batteries, and in particular, to a battery module.

BACKGROUND

A battery module generally includes a plurality of batteries, two end plates, and two side plates. The two end plates and the two side plates of a traditional battery module are generally butt welded to form an enclosure structure for fixing the plurality of batteries. The battery module of such a structure generally incurs the following problems: (1) during the welding, an assembling efficiency of the battery module is not high as affected by process operations; (2) when a swelling force is exerted on the battery module that is in use, the swelling force is up to 30 KN or more, and the end plates and the side plates are just connected by welding. In addition, the butt welding leaves many welds (generally as many as four welds) whose strength is generally just 70% of that of a parent metal. Therefore, a problem of weld cracking often occurs (any weld crack will cause the battery module to fall apart).

SUMMARY

In view of problems in background technologies, an objective of this application is to provide a battery module.

To achieve the above objective, this application provides a battery module, including a plurality of batteries, a first enclosing plate, a second enclosing plate, and fasteners. The first enclosing plate includes a first side plate, a first front plate connected to the first side plate and containing a first connecting hole, and a first rear plate connected to the first side plate and containing a third connecting hole. The first rear plate and the first front plate are disposed oppositely in a longitudinal direction. The second enclosing plate includes a second side plate, a second front plate connected to the second side plate and containing a second connecting hole, and a second rear plate connected to the second side plate and containing a fourth connecting hole. The second rear plate and the second front plate are disposed oppositely in the longitudinal direction. The first connecting hole and the second connecting hole are fixedly connected to the first front plate and the second front plate by the fasteners. The third connecting hole and the fourth connecting hole are fixedly connected to the first rear plate and the second rear plate by the fasteners, so that the first enclosing plate and the second enclosing plate jointly enclose and fix the plurality of batteries.

The batteries include a lower region and an upper-middle region in an up-down direction. A quantity of the first connecting holes disposed in a part that is of the first front plate and that corresponds to the upper-middle region is larger than a quantity of the first connecting holes disposed in a part that is of the first front plate and that corresponds to the lower region.

A distance between the first connecting hole and the first side plate in a transverse direction is greater than a distance between the first connecting hole and the second side plate in the transverse direction. A position of the second connecting hole matches the first connecting hole.

A distance between the third connecting hole and the first side plate in the transverse direction is less than a distance between the third connecting hole and the second side plate in the transverse direction. A position of the fourth connecting hole matches the third connecting hole.

The battery module further includes two end plates disposed on two sides of the plurality of batteries along the longitudinal direction. The first front plate and the second front plate are fixedly connected to the corresponding end plates by the fasteners. The first rear plate and the second rear plate are fixedly connected to the corresponding end plates by the fasteners.

The first front plate includes a first end part close to the second front plate in the transverse direction, and the second front plate includes a second end part close to the first front plate in the transverse direction. The first front plate further contains a first limiting groove that fits the second end part of the second front plate in a concave-convex manner. The second front plate further contains a second limiting groove that fits the first end part of the first front plate in a concave-convex manner, and a concave direction of the second limiting groove is opposite to a concave direction of the first limiting groove.

The first limiting groove is formed on a surface of the first end part in the longitudinal direction, extends along the transverse direction, and is available for inserting the second end part. The second limiting groove is formed on a surface of the second end part in the longitudinal direction, extends along the transverse direction, and is available for inserting the first end part. The first connecting hole is disposed at the first end part, and the second connecting hole is disposed at the second end part.

The first limiting groove is located on the side of the first end part in the transverse direction and extends along an up-down direction, and the second end part clings to a wall of the first limiting groove. The second limiting groove is located on the side of the second end part in the transverse direction and extends along the up-down direction, and the first end part clings to a wall of the second limiting groove. The first connecting hole is disposed at the first end part and/or the first limiting groove, and the second connecting hole is disposed at the second end part and/or the second limiting groove.

The first front plate includes a first end part close to the second front plate, and the second front plate includes a second end part close to the first front plate. The first front plate further contains a limiting open slot configured to be available for inserting the second end part.

The first enclosing plate further includes a first upper plate connected to the first side plate and located above the plurality of batteries. The second enclosing plate further includes a second upper plate connected to the second side plate and located above the plurality of batteries.

REFERENCE NUMERALS ARE AS FOLLOWS

1: Battery;
1A: Lower region;
1B: Upper-middle region;
2: First enclosing plate;
21: First side plate;
22: First front plate;
221: First connecting hole;
222: First limiting groove;
223: Limiting open slot;
23: First rear plate;
231: Third connecting hole;
24: First upper plate;
3: Second enclosing plate;
31: Second side plate;
32: Second front plate;
321: Second connecting hole;
322: Second limiting groove;
33: Second rear plate;
331: Fourth connecting hole;
34: Second upper plate;
4: End plate;
S: Fastener;
X: Transverse direction;
Y: Longitudinal direction; and
Z: Up-down direction.

DETAILED DESCRIPTION

To make the objectives, technical solutions, and advantages of this application clearer, the following describes this application in further detail with reference to accompanying drawings and embodiments. Understandably, the specific embodiments described herein are merely intended to explain this application, but are not intended to limit this application.

In the description of this application, unless otherwise expressly specified, the terms "first", "second", "third", and "fourth" are for the sole purpose of description rather than indicating or implying any order of preference; the term "a plurality of" means two or more; unless otherwise expressly specified, the terms such as "connect" and "fix" shall be understood in a broad sense. For example, a "connection" may be a fixed connection, or a detachable connection, or an integrated connection, or an electrical connection or signal connection; or may be a direct connection or an indirect connection implemented through an intermediate medium. A person of ordinary skill in the art can understand the specific meanings of the terms in this application according to the context.

Understandably, in the description of this application, directional terms such as "upper", "lower", "front", and "rear" described in the embodiments of this application are described from a perspective shown in the drawings, and shall not be understood as a limitation on the embodiments of this application. In addition, understandably, depending on the context, one element described as being connected "on" or "under" another element not only means that the element may be directly connected "on" or "under" the other element, but also means that the element may be indirectly connected "on" or "under" the other element through an intermediate element. The following describes this application in further detail with reference to specific embodiments and accompanying drawings.

Figure 1:
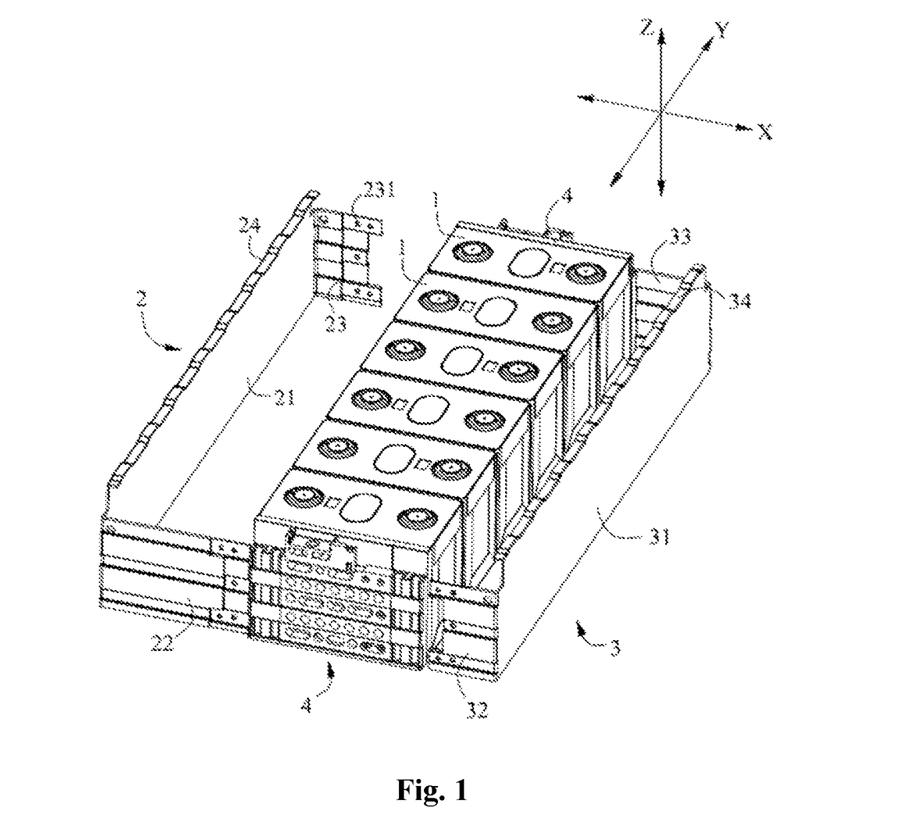
FIG. 1 is an exploded view of a battery module according to this application.
Figure 2:
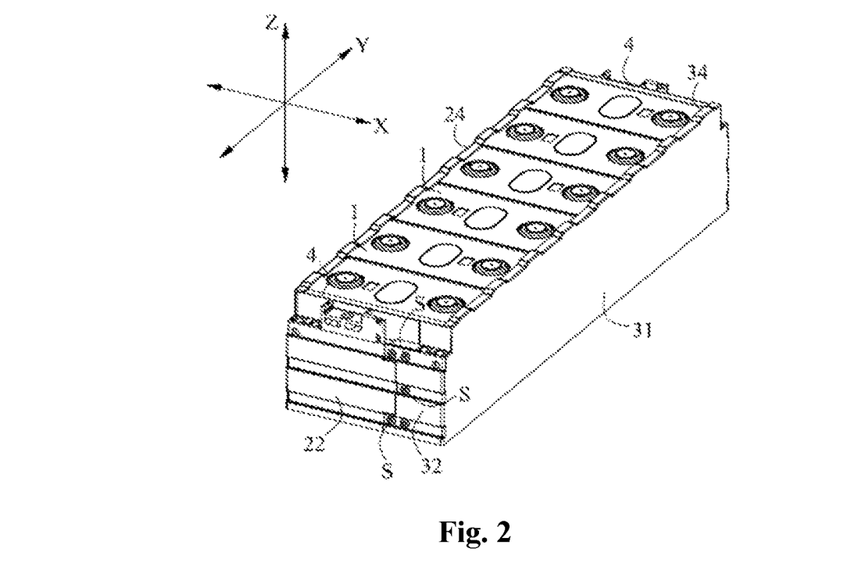
FIG. 2 is an assembly diagram of FIG. 1.

Referring to FIG. 1 and FIG. 2, the battery module according to this application includes a plurality of batteries 1, a first enclosing plate 2, a second enclosing plate 3, end plates 4, and fasteners (S).

Referring to FIG. 1 and FIG. 4 to FIG. 9, the first enclosing plate 2 includes a first side plate 21, a first front plate 22 connected to the first side plate 21 and containing a first connecting hole 221, and a first rear plate 23 connected to the first side plate 21 and containing a third connecting hole 231. The first rear plate 23 and the first front plate 22 are disposed oppositely in a longitudinal direction Y, and are respectively connected to two ends of the first side plate 21.

Referring to FIG. 1 and FIG. 4 to FIG. 9, the second enclosing plate 3 includes a second side plate 31, a second front plate 32 connected to the second side plate 31 and containing a second connecting hole 321, and a second rear plate 33 connected to the second side plate 31 and containing a fourth connecting hole 331. The second rear plate 33 and the second front plate 32 are disposed oppositely in the longitudinal direction Y, and are respectively connected to two ends of the second side plate 31.

The first side plate 21 and the second side plate 31 are respectively located on two sides of the plurality of batteries 1 in a transverse direction X. The first front plate 22 and the second front plate 32 are located on one side of the plurality of batteries 1 in the longitudinal direction Y. The first rear plate 23 and the second rear plate 33 are located on the other side of the plurality of batteries 1 in the longitudinal direction Y, as shown in FIG. 1. The first connecting hole 221 on the first front plate 22 and the second connecting hole 321 on the second front plate 32 are fixedly connected to the first front plate 22 and the second front plate 32 by the fasteners S. The third connecting hole 231 on the first rear plate 23 and the fourth connecting hole 331 on the second rear plate 33 are fixedly connected to the first rear plate 23 and the second rear plate 33 by the fasteners S, so that the first enclosing plate 2 and the second enclosing plate 3 jointly enclose and fix the plurality of batteries 1.

In the battery module according to this application, both the first enclosing plate 2 and the second enclosing plate 3 form a semi-enclosure structure, and tightly enclose the plurality of batteries 1 in a clasping manner. Merely two junctions exist between the two enclosing plates (that is, the first front plate 22 needs to be connected to the second front plate 32, and the first rear plate 23 needs to be connected to the second rear plate 33), thereby decreasing junctions, reducing risks of failure at the junctions and improving structural strength of the battery module significantly. In addition, the first enclosing plate 2 and the second enclosing plate 3 are fixedly connected into an entirety by the fasteners S. Such a connection manner is easy to operate, facilitates installation and disassembly of the battery module, and thus improves the assembling efficiency.

To simplify a process of forming parts of the battery module, the first enclosing plate 2 and the second enclosing plate 3 may adopt the same structure. Further, a structure of the first rear plate 23 is the same as that of the second front plate 32. A structure of the second rear plate 33 is the same as that of the first front plate 22.

Figure 3:
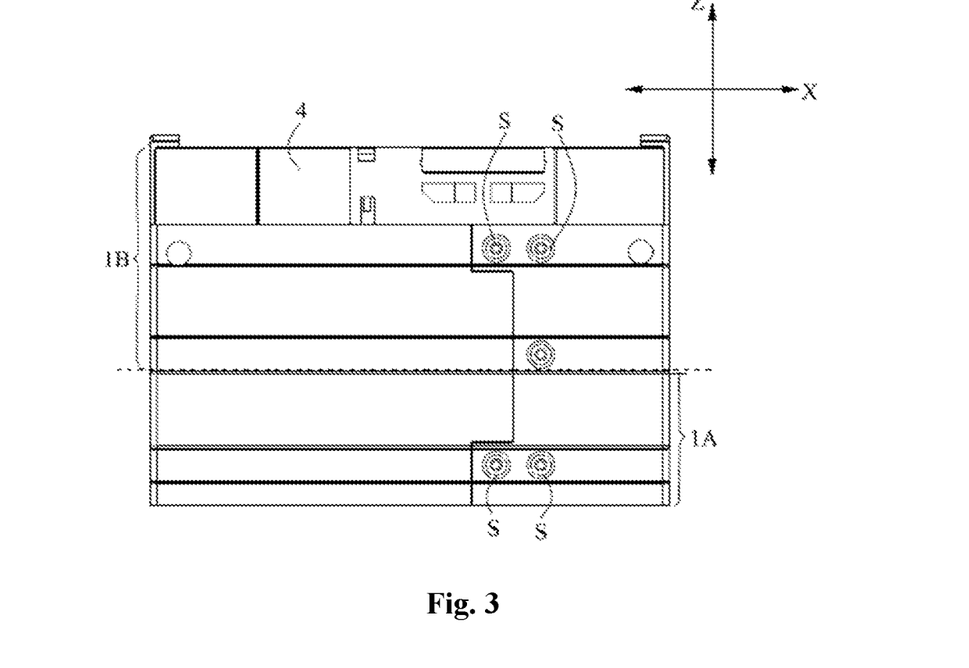
FIG. 3 is a front view of FIG. 2.

Referring to FIG. 3, the batteries 1 may include a lower region 1A and an upper-middle region 1B in an up-down direction Z (that is, the two regions are demarcated by a dashed line in FIG. 3). Specifically, the upper-middle region 1B of the batteries 1 is an upper ⅔ part of the batteries 1, and the lower region 1A is a lower ⅓ part of the batteries 1.

During use of the battery module, the upper-middle region 1B of the batteries 1 swells and deforms more than the lower region 1A. Therefore, to improve capabilities of the first enclosing plate 2 and the second enclosing plate 3 in resisting swelling and deformation of the batteries 1, the quantity of the first connecting holes 221 disposed on a part that is of the first front plate 22 and that corresponds to the upper-middle region 1B of the batteries 1 is larger than the quantity of the first connecting holes 221 disposed on a part that is of the first front plate 22 and that corresponds to the lower region 1A (correspondingly, the second connecting holes 321 are disposed on the second front plate 32 in the same way as the disposing of the first connecting holes 221). In other words, the quantity of the fasteners S located in the upper-middle region 1B of the batteries 1 in the longitudinal direction Y is larger than the quantity of the fasteners S located in the lower region 1A, thereby increasing overall strength of the battery module.

Similarly, on the other side of the plurality of batteries 1, the third connecting hole 231 on the first rear plate 23 and the fourth connecting hole 331 on the second rear plate 33 may be disposed in the same way as the first connecting hole 221.

Referring to FIG. 1 to FIG. 9, after the enclosing plate 2 and the second enclosing plate 3 are assembled, a distance between the first connecting hole 221 and the first side plate 21 in the transverse direction X is greater than a distance between the first connecting hole 221 and the second side plate 31 in the transverse direction X (in this case, the size of the first front plate 22 in the transverse direction X is larger than the size of the second front plate 32 in the transverse direction X). The position of the second connecting hole 321 matches the first connecting hole 221. In other words, the fasteners S are disposed close to the second side plate 31 in the transverse direction X.

It needs to be noted that the first connecting hole 221 and the second connecting hole 321 are a first junction between the first enclosing plate 2 and the second enclosing plate 3, and the plurality of batteries 1 swell and deform most in a middle region in the transverse direction X. Therefore, when the first connecting hole 221 and the second connecting hole 321 are disposed in the way above, the first junction between the first enclosing plate 2 and the second enclosing plate 3 deviates from the middle region that is most swollen and deformed, thereby reducing an impact caused by the swelling and deformation onto the first junction and thus improving the capabilities of the first enclosing plate 2 and the second enclosing plate 3 in resisting the swelling and deformation of the batteries 1.

Referring to FIG. 1 to FIG. 9, a distance between the third connecting hole 231 and the first side plate 21 in the transverse direction X is less than a distance between the third connecting hole 231 and the second side plate 31 in the transverse direction X (in this case, the size of the first rear plate 23 in the transverse direction X is less than the size of the second rear plate 33 in the transverse direction X). The position of the fourth connecting hole 331 matches the third connecting hole 231. In other words, the fasteners S are disposed close to the second side plate 31 in the transverse direction X.

Similarly, it needs to be noted that the third connecting hole 231 and the fourth connecting hole 331 are a second junction between the first enclosing plate 2 and the second enclosing plate 3, and the plurality of batteries 1 swell and deform most in the middle region in the transverse direction X. Therefore, when the third connecting hole 231 and the fourth connecting hole 331 are disposed in the way above, the second junction between the first enclosing plate 2 and the second enclosing plate 3 also deviates from the middle region that is most swollen and deformed, thereby reducing the impact caused by the swelling and deformation onto the second junction and thus improving the capabilities of the first enclosing plate 2 and the second enclosing plate 3 in resisting the swelling and deformation of the batteries 1. In addition, the second connecting part and the first connecting part are disposed diagonally, thereby increasing connection strength between the first enclosing plate 2 and the second enclosing plate 3 and thus increasing overall structural strength of the battery module.

Referring to FIG. 4 to FIG. 9, the first front plate 22 includes a first end part 22C close to the second front plate 32 in the transverse direction X, and the second front plate 32 includes a second end part 32C close to the first front plate 22 in the transverse direction X.

Referring to FIG. 4 to FIG. 7, the first front plate 22 further contains a first limiting groove 222 that fits the second end part 32C of the second front plate 32 in a concave-convex manner. The second front plate 32 further contains a second limiting groove 322 that fits the first end part 22C of the first front plate 22 in a concave-convex manner, and a concave direction of the second limiting groove 322 is opposite to a concave direction of the first limiting groove 222. The first front plate 22 fits the second front plate 32 in such a concave-convex manner, thereby enabling rapid positioning and improving the assembling efficiency. In addition, the concave direction of the second limiting groove 322 is opposite to the concave direction of the first limiting groove 222. Therefore, after the first front plate 22 and the second front plate 32 are installed, the overall enclosure size of the first enclosing plate 2 and the second enclosing plate 3 does not increase additionally.

Figure 4:
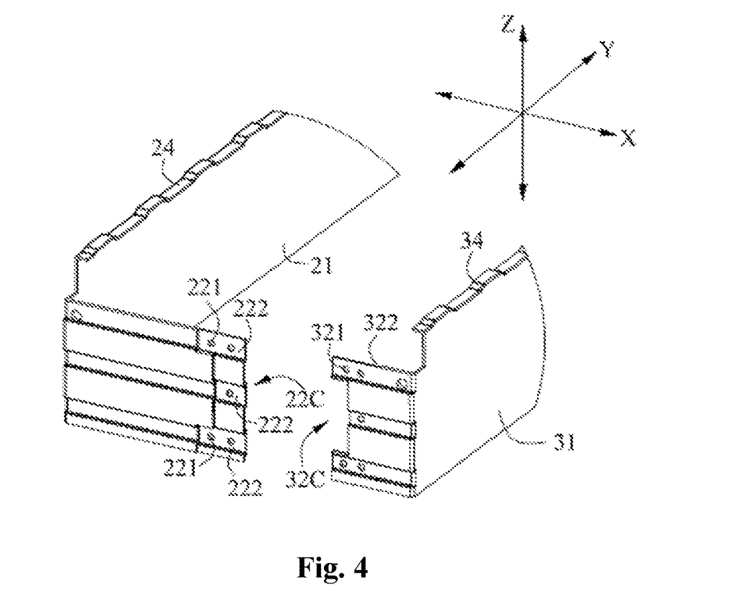
FIG. 4 is a three-dimensional view of the first enclosing plate and the second enclosing plate shown in FIG. 2 before installation, in which just a part of structures of the first enclosing plate and the second enclosing plate is shown.
Figure 5:
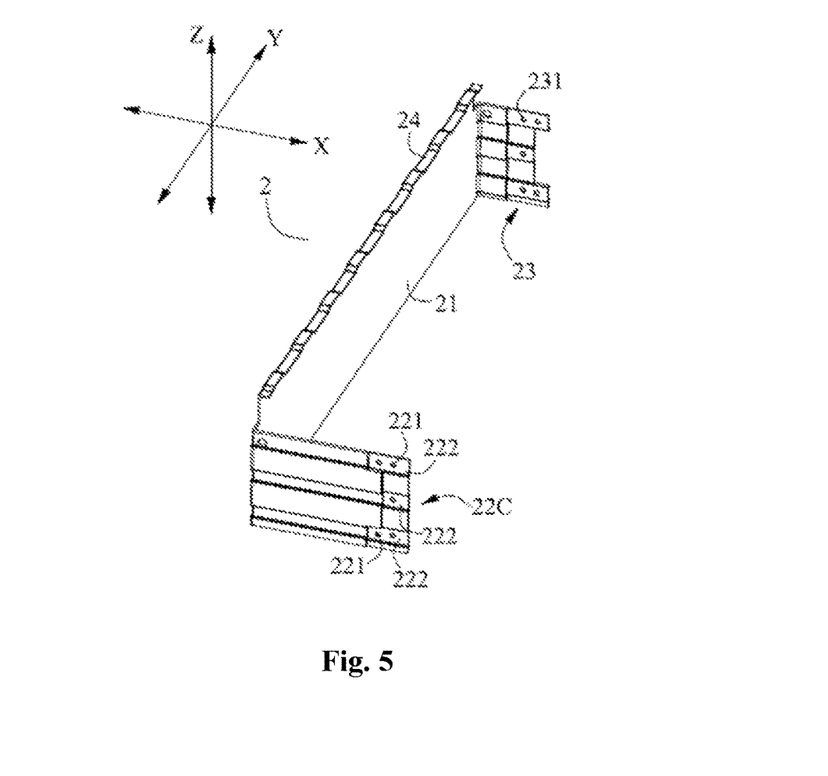
FIG. 5 is a three-dimensional view of the first enclosing plate shown in FIG. 4.

In an embodiment, referring to FIG. 4 and FIG. 5, the first limiting groove 222 may be formed on a surface of the first end part 22C in the longitudinal direction Y, extends along the transverse direction X, and is available for inserting the second end part 32C. The second limiting groove 322 is formed on a surface of the second end part 32C in the longitudinal direction Y, extends along the transverse direction X, and is available for inserting the first end part 22C. The first connecting hole 221 is disposed at the first end part 22C, and the second connecting hole 321 is disposed at the second end part 32C. Specifically, the first limiting groove 222 is formed on the surface that is of the first end part 22C and that faces the batteries 1, and correspondingly, the second limiting groove 322 is formed on the surface that is of the second end part 32C and back from the batteries 1. Alternatively, the first limiting groove 222 is formed on the surface that is of the first end part 22C and back from the batteries 1 (as shown in FIG. 4 and FIG. 5), and correspondingly, the second limiting groove 322 is formed on the surface that is of the second end part 32C and that faces the batteries 1 (as shown in FIG. 4).

Further, referring to FIG. 4 and FIG. 5, the quantity of the first limiting grooves 222 may be plural in number. The plurality of first limiting grooves 222 are spaced apart in the transverse direction X. The second limiting groove 322 is consistent with the first limiting groove 222 in number.

Figure 6:
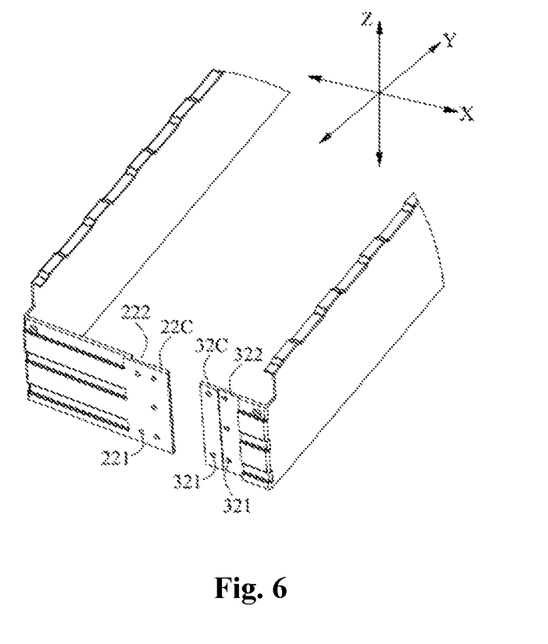
FIG. 6 is a variation of FIG. 4.
Figure 7:
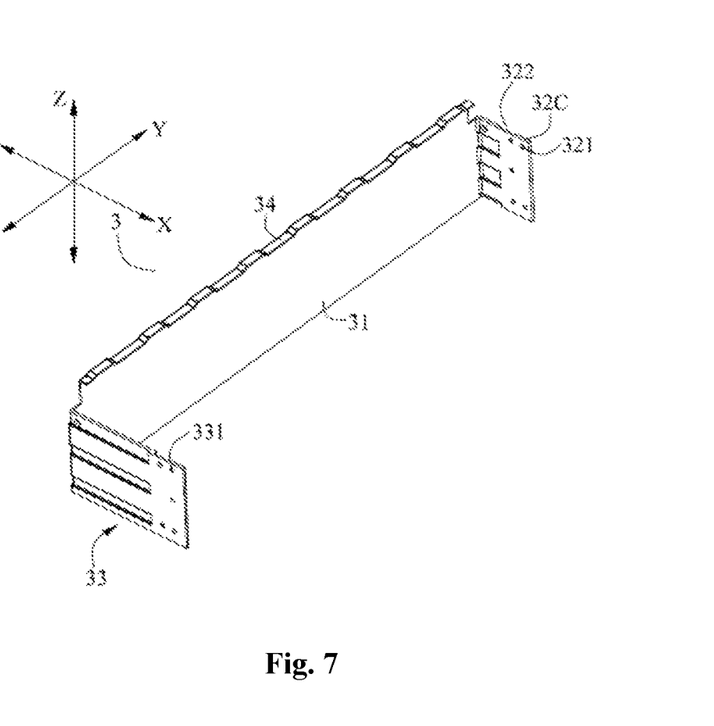
FIG. 7 is a three-dimensional view of the second enclosing plate shown in FIG. 6.

In another embodiment, referring to FIG. 6 and FIG. 7, the first limiting groove 222 is located on the side of the first end part 22C in the transverse direction and extends along the up-down direction. The second end part 32C clings to a wall of the first limiting groove 222. The second limiting groove 322 is located on the side of the second end part 32C in the transverse direction X and extends along the up-down direction Z. The first end part 22C clings to a wall of the second limiting groove 322. The first connecting hole 221 is disposed at the first end part 22C and/or the first limiting groove 222, and the second connecting hole 321 is disposed at the second end part 32C and/or the second limiting groove 322. In this way, the clinging effect between the second end part 32C and the first limiting groove 222, the clinging effect between the first end part 22C and the second limiting groove 322, and the connecting effect of the first connecting hole 221 and the second connecting hole 321 through the fasteners S increase the connection strength between the first enclosing plate 2 and the second enclosing plate 3, and thus increase the overall structural strength of the battery module.

Figure 8:
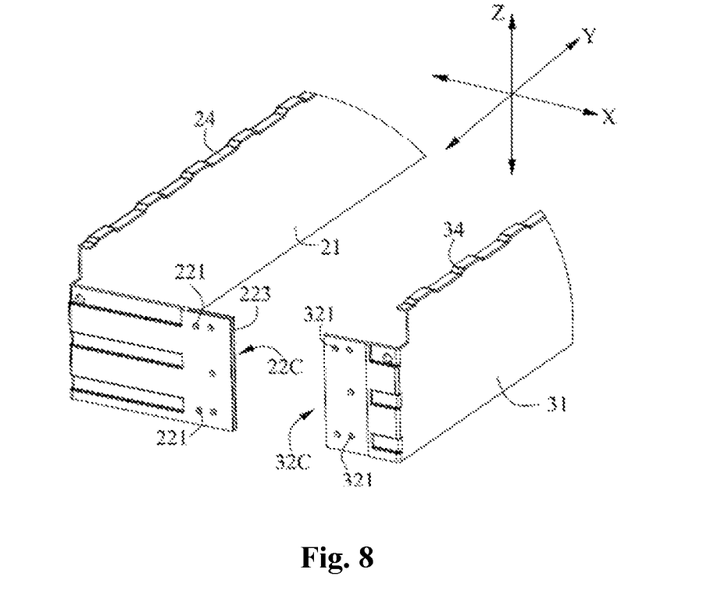
FIG. 8 is another variation of FIG. 4.
Figure 9:
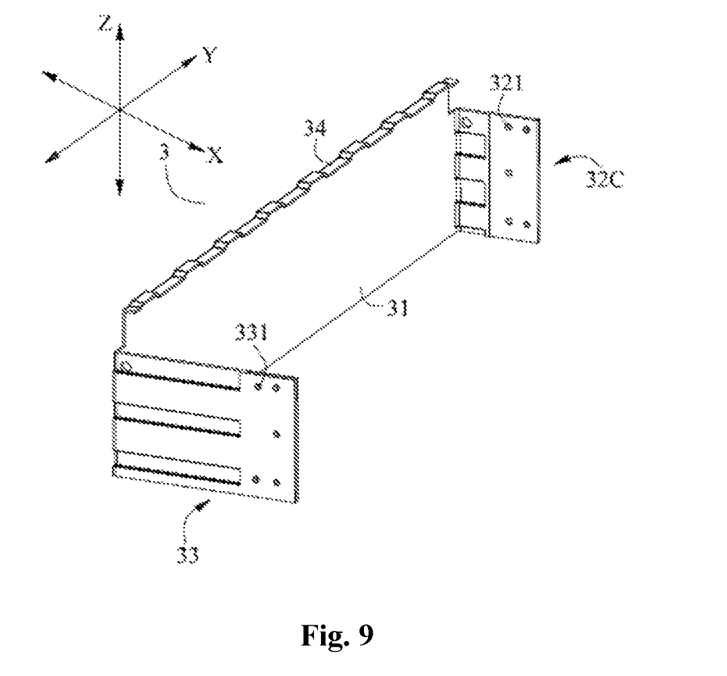
FIG. 9 is a three-dimensional view of the second enclosing plate shown in FIG. 8.

In another embodiment, referring to FIG. 8 and FIG. 9, the first front plate 22 includes a first end part 22C close to the second front plate 32, and the second front plate 32 includes a second end part 32C close to the first front plate 22. The first front plate 22 further contains a limiting open slot 223 configured to be available for inserting the second end part 32C. The limiting open slot 223 may be a U-shaped structure. Such a mutual insertion method makes installation simple and fast, and improves the assembling efficiency.

In addition, to increase the structural strength of the first enclosing plate 2 itself, a reinforcing rib structure may be added to the first side plate 21, the first front plate 22, and the first rear plate 23 of the first enclosing plate 2 separately. Similarly, a reinforcing rib structure may be added to the second side plate 31, the second front plate 32, the second rear plate 33 of the second enclosing plate 3 separately to increase the structural strength of the second enclosing plate 3 itself.

Referring to FIG. 1 to FIG. 9, the first enclosing plate 2 may further include a first upper plate 24 connected to the first side plate 21 and located above the plurality of batteries 1. The second enclosing plate 3 further includes a second upper plate 34 connected to the second side plate 31 and located above the plurality of batteries 1. The first upper plate 24 and the second upper plate 34 are configured together to limit the positions of the plurality of batteries 1 in the up-down direction Z. To increase the strength, the first upper plate 24 and the second upper plate 34 may be a corrugated plate-like structure.

Referring to FIG. 1 and FIG. 2, the two end plates 4 are disposed on two sides of the plurality of batteries 1 along the longitudinal direction Y, and are located in a space defined by the first enclosing plate 2 and the second enclosing plate 3. The first front plate 22 and the second front plate 32 are fixedly connected to the corresponding end plates 4 by the fasteners S. The first rear plate 23 and the second rear plate 33 are fixedly connected to the corresponding end plates 4 by the fasteners S. During the use of the battery module, the end plate 4, the first enclosing plate 2, and the second enclosing plate 3 form a "double shield" to jointly resist the swelling and deformation of the batteries 1, thereby increasing the structural strength of the battery module.

What is claimed is:

1. A battery module, comprising a plurality of batteries, a first enclosing plate, a second enclosing plate, and fasteners, wherein the first enclosing plate comprises a first side plate, a first front plate connected to the first side plate and containing a first connecting hole, and a first rear plate connected to the first side plate and containing a third connecting hole, wherein the first rear plate and the first front plate are disposed oppositely in a longitudinal direction;

the second enclosing plate comprises a second side plate, a second front plate connected to the second side plate and containing a second connecting hole, and a second rear plate connected to the second side plate and containing a fourth connecting hole, wherein the second rear plate and the second front plate are disposed oppositely in the longitudinal direction;

the battery module further comprises two end plates disposed on two sides of the plurality of batteries along the longitudinal direction;

the first front plate and the second front plate are at least partially stacked, and the first connecting hole and the second connecting hole are penetrated through and overlapped along a stacked direction of the first front plate and the second front plate;

the first rear plate and the second rear plate are at least partially stacked, and the third connecting hole and the fourth connecting hole are penetrated through and overlapped along a stacked direction of the first rear plate and the second rear plate; and the first front plate and the second front plate are fixedly connected to one of the two end plates by the fasteners penetrating through the first connecting hole and the second connecting hole, and the first rear plate and the second rear plate are fixedly connected to the other of the two end plates by the fasteners penetrating through the third connecting hole and the fourth connecting hole, so that the first enclosing plate, the second enclosing plate and the two end plates jointly enclose and fix the plurality of batteries.

2. The battery module according to claim 1, wherein the batteries comprise a lower region and an upper-middle region in an up-down direction;

a quantity of the first connecting holes disposed in a part that is of the first front plate and that corresponds to the upper-middle region is larger than a quantity of the first connecting holes disposed in a part that is of the first front plate and that corresponds to the lower region.

3. The battery module according to claim 1, wherein a distance between the first connecting hole and the first side plate in a transverse direction is greater than a distance between the first connecting hole and the second side plate in the transverse direction; and a position of the second connecting hole matches the first connecting hole.

4. The battery module according to claim 1, wherein a distance between the third connecting hole and the first side plate in a transverse direction is less than a distance between the third connecting hole and the second side plate in the transverse direction; and a position of the fourth connecting hole matches the third connecting hole.

5. The battery module according to claim 1, wherein the first front plate comprises a first end part close to the second front plate in a transverse direction, and the second front plate comprises a second end part close to the first front plate in the transverse direction;

the first front plate further contains a first limiting groove that fits the second end part of the second front plate in a concave-convex manner; and the second front plate further contains a second limiting groove that fits the first end part of the first front plate in a concave-convex manner, and a concave direction of the second limiting groove is opposite to a concave direction of the first limiting groove.

6. The battery module according to claim 5, wherein the first limiting groove is formed on a surface of the first end part in the longitudinal direction, extends along the transverse direction, and is available for inserting the second end part;

the second limiting groove is formed on a surface of the second end part in the longitudinal direction, extends along the transverse direction, and is available for inserting the first end part; and the first connecting hole is disposed at the first end part, and the second connecting hole is disposed at the second end part.

7. The battery module according to claim 5, wherein the first limiting groove is located on the side of the first end part in the transverse direction and extends along an up-down direction, and the second end part clings to a wall of the first limiting groove;

the second limiting groove is located on the side of the second end part in the transverse direction and extends along the up-down direction, and the first end part clings to a wall of the second limiting groove; and the first connecting hole is disposed at the first end part and/or the first limiting groove, and the second connecting hole is disposed at the second end part and/or the second limiting groove.

8. The battery module according to claim 1, wherein the first front plate comprises a first end part close to the second front plate, and the second front plate comprises a second end part close to the first front plate; and the first front plate further contains a limiting open slot configured to be available for inserting the second end part.

9. The battery module according to claim 1, wherein the first enclosing plate further comprises a first upper plate connected to the first side plate and located above the plurality of batteries; and the second enclosing plate further comprises a second upper plate connected to the second side plate and located above the plurality of batteries.

\* \* \* \* \*